(12) United States Patent
Itabashi et al.

(10) Patent No.: US 9,546,096 B2
(45) Date of Patent: Jan. 17, 2017

(54) METHOD FOR PRODUCING MAZ-TYPE ZEOLITE (71) Applicants: UniZeo Co., Ltd., Tokyo (JP); THE UNIVERSITY OF TOKYO, Tokyo (JP)

(72) Inventors: Keiji Itabashi, Tokyo (JP); Tatsuya Okubo, Tokyo (JP); Akari Ogawa, Tokyo (JP); Shanmugam Palani Elangovan, Tokyo (JP)

(73) Assignees: UNIZEO CO., LTD., Tokyo (JP); The University of Tokyo, Tokyo (JP)

( * ) Notice: Subject to any disclaimer, the term of this patent is extended or adjusted under 35 U.S.C. 154(b) by 191 days.

(21) Appl. No.: 14/414,166

(22) PCT Filed: Jul. 16, 2013

(86) PCT No.: PCT/JP2013/069251
§ 371 (c)(1),
(2) Date: Jan. 12, 2015

(87) PCT Pub. No.: WO2014/013969
PCT Pub. Date: Jan. 23, 2014

(65) Prior Publication Data
US 2015/0210556 A1 Jul. 30, 2015

(30) Foreign Application Priority Data
Jul. 20, 2012 (JP) .................. 2012-161786

(51) Int. Cl.
*C01B 39/34* (2006.01)
*B01J 37/10* (2006.01)
(Continued)

(52) U.S. Cl.
CPC ............... *C01B 39/34* (2013.01); *B01J 20/18* (2013.01); *B01J 20/3085* (2013.01);
(Continued)

(58) Field of Classification Search
CPC ........ C01B 39/34; B01J 20/18; B01J 20/3085; B01J 29/7011; B01J 37/04; B01J 37/10
See application file for complete search history.

(56) References Cited

U.S. PATENT DOCUMENTS 4,021,447 A    5/1977    Rubin et al.
4,241,036 A  *  12/1980    Flanigen ................. C01B 39/34
                                                                                                      423/705
(Continued)

FOREIGN PATENT DOCUMENTS

EP        0 230 452 B1    6/1989
JP        63-500238 A    1/1988
JP        3-237013 A    10/1991

OTHER PUBLICATIONS

Goossens et al., "Crystallization of MAZ-type zeolites using tetramethylammonium, sodium, and n-hexane derivatives as structure- and composition-directing agents", Microporous and Mesoporous Materials 35-36, 2000, pp. 555-572.
(Continued)

*Primary Examiner* — David M Brunsman
(74) *Attorney, Agent, or Firm* — Locke Lord LLP (57) ABSTRACT

Provided is a method for producing a MAZ-type zeolite, the method having an environmental impact which has been reduced as much as possible while not using a structure-directing agent as far as possible. In the method for producing a MAZ-type zeolite according to the present invention: (1) a silica source, an alumina source, an alkali source and water are mixed so as to form a reaction mixture that has a composition represented by a specific molar ratio; (2) a MAZ-type zeolite, which has a $SiO_2/Al_2O_3$ ratio of 5-10, has an average particle diameter of at least 0.1 μm and does not contain an organic compound, is added, as a seed crystal, into the reaction mixture in an amount of 0.1-30 weight % relative to the silica components in the reaction mixture; and
(Continued)

EXAMPLE 1 (MAZ-TYPE ZEOLITE)

(3) the reaction mixture, into which the seed crystal has been added, is heated at 80-200° C. in a closed system.

4 Claims, 5 Drawing Sheets

(51) Int. Cl.
  *B01J 20/18* (2006.01)
  *B01J 20/30* (2006.01)
  *B01J 29/70* (2006.01)
  *B01J 37/04* (2006.01)
  *B01J 37/08* (2006.01)
(52) U.S. Cl.
  CPC ........... *B01J 29/7011* (2013.01); *B01J 37/04* (2013.01); *B01J 37/08* (2013.01); *B01J 37/10* (2013.01)

(56) References Cited

U.S. PATENT DOCUMENTS

| | | | |
|---|---|---|---|
| 4,331,643 A * | 5/1982 | Rubin | ............... C01B 39/34 423/703 |
| 4,377,502 A * | 3/1983 | Klotz | ............... B01J 29/18 423/702 |
| 4,503,023 A | 3/1985 | Breck et al. | |
| 4,840,779 A | 6/1989 | Cannan | |
| 5,277,791 A | 1/1994 | Di Renzo et al. | |
| 5,968,341 A * | 10/1999 | Di Renzo | ............ B01J 29/7011 208/111.01 |
| 2015/0210556 A1 * | 7/2015 | Itabashi | ................. C01B 39/34 423/709 |

OTHER PUBLICATIONS

Martucci et al., "Crystal structure of zeolite omega, the synthetic counterpart of the natural zeolite mazzite", Microporous and Mesoporous Materials 63, 2003, pp. 33-42.

International Search Report dated Oct. 29, 2013, issued in corresponding application No. PCT/JP2013/069251.

Mirajkar et al., "Hydrothermal Synthesis of Al- and Ga-Substituted Omega Zeolite", Journal of Inclusion Phenomena and Molecular Recognition in Chemistry, Kluwer, Dordrecht, NL, Jan. 1, 1993, vol. 16, No. 2, pp. 139-153, cited in Extended European Search Report dated Jun. 1, 2015.

Extended European Search Report dated Jun. 1, 2015, issued in corresponding Patent Application No. 13819955.9 (8 pages).

\* cited by examiner

METHOD FOR PRODUCING MAZ-TYPE ZEOLITE

This application is a 371 of PCT/JP2013/069251, filed Jul. 16, 2013.

TECHNICAL FIELD

The present invention relates to a method for producing an MAZ-type zeolite from a reaction mixture using no organic compounds by adding an MAZ-type zeolite containing no organic compounds as a seed crystal.

BACKGROUND ART

A synthetic zeolite is crystalline aluminosilicate, and has uniform pores with angstrom sizes attributed to a crystal structure thereof. Taking advantage of such a feature, the synthetic zeolite has been industrially used as a molecular sieving adsorbent that adsorbs only a molecule having a particular size, an adsorption separating agent that adsorbs a molecule having strong affinity, or a catalytic base.

By the way, MAZ is a designation representing a skeletal structure type to which a zeolite omega belongs. An MAZ-type zeolite is a zeolite having a large pore with an 8-membered ring and 12-membered ring, has the high adsorption ability of ammonia, and promising as an isomerization activating catalyst for n-hexane. Conventionally, the MAZ-type zeolite has been produced by only a method using tetramethylammonium ions and the like as an organic structure-directing agent (hereinafter, abbreviated as "OSDA") (See, Patent Documents 1 and 2, and Non-Patent Documents 1 and 2). Therefore, it has been believed that it is essential to use an OSDA in order to obtain the MAZ-type zeolite. In addition, it has been believed that it is inevitable for the synthesized MAZ-type zeolite to be fired so as to remove an OSDA before use, since it contains the OSDA.

A synthetic method of the MAZ-type zeolite is for example, as described in Patent Documents 1 and 2, and Non-Patent Documents 1 and 2, and a common method is one using tetramethylammonium ions as an OSDA in the coexistence of sodium ions and potassium ions. However, since said OSDA is expensive, it is not advantageous to be used industrially. In addition, since the OSDA is incorporated in the crystals of the produced zeolite, it is necessary to fire the zeolite to remove the OSDA when the zeolite is used as an adsorbent or a catalyst. Exhaust gases produced at that time are responsible for environmental pollution, and further, many drugs are required for detoxification treatment of synthetic mother liquor containing decomposition products of the OSDA. In this way, the method for synthesizing the MAZ-type zeolite using the OSDA is not only an expensive method but also a production method having a great environmental load. Thus, there is a need to realize a production method using no OSDAs and an MAZ-type zeolite essentially containing no organic matters obtained by the method.

Patent Document 1: U.S. Pat. No. 4,021,447, Specification
Patent Document 2: U.S. Pat. No. 4,503,023, Specification
Non-Patent Document 1: Microporous and Mesoporous Materials, 35, 555-572, 2000
Non-Patent Document 2: Microporous and Mesoporous Materials, 63, 33-42, 2003

DISCLOSURE OF THE INVENTION

Problems to be Solved by the Invention

An object of the present invention is to provide a production method of an MAZ-type zeolite essentially containing no organic matters, that is, a method which can solve drawbacks of the prior art described above, reduce an environmental load as much as possible and produce an MEZ-type zeolite at low cost without using OSDA.

Means for Solving the Problems

The present invention provides a production method for an MAZ-type zeolite, which comprises
(1) mixing a silica source, an alumina source, an alkali source and water so as to be a reaction mixture having a composition represented by a molar ratio given below;
$SiO_2/Al_2O_2$=24-60
$(Na_2O+K_2O)/SiO_2$=0.25-0.5
$K_2O/(Na_2O+K_2O)$=0.1-0.5
$H_2O/SiO_2$=5-50
(2) using an MAZ-type zeolite having no organic matters which has an $SiO_2/Al_2O_2$ ratio of 5-10 and an average particle size of 0.1 μm or more, as a seed crystal, and adding the MAZ-type zeolite to the reaction mixture at a proportion of 0.1-30% by weight with respect to a silica component in the reaction mixture; and
(3) airtightly heating the reaction mixture to which the seed crystal is added at 80-200° C.

Effects of the Invention

According to the present invention, by adding an MAZ-type zeolite containing no organic matters as a seed crystal, an MAZ-type zeolite is produced from a reaction mixture using no OSDAs and therefore, the resulting MAZ-type zeolite essentially contains no organic matters. Thus, since the MAZ-type zeolite not only requires no firing treatments before use, but also generates no organic matters even after dehydration treatment, the exhaust gas treatment is not necessary, an environmental load is small and it is possible to produce the MAZ-type zeolite at low cost.

BRIEF DESCRIPTION OF THE DRAWINGS

FIG. 5 (a) is a desorption curve of the ammonia TPD for the one obtained by converting the zeolite omega (MAZ-type zeolite) used as a seed crystal in Example 1 to H⁺-type and FIG. 5 (b) is a desorption curve of the ammonia TPD for the one obtained by converting the MAZ-type zeolite obtained by Example 3 to H⁺-type.

PREFERRED MODE FOR CARRYING OUT THE INVENTION

The present invention will be explained based on its preferred embodiment below. An MAZ-type zeolite synthesized according to the present invention essentially contains no organic matters in a state in which it is not heat-treated. The organic matter herein primarily encompasses quaternary ammonium compounds used as an OSDA in the synthesis of zeolites. Ions present outside the aluminosilicate framework by charge compensation for the negative charge of the four-coordinated aluminum in the framework are alkali metal ions such as sodium ions and potassium ions, and others present in the pore are only water or a small amount of adsorption gases. That is, the MAZ-type zeolite synthesized according to the present invention is obtained by a production method using no OSDAs described below and therefore, it essentially contain no organic matters including the OSDAs. An $SiO_2/Al_2O_3$ ratio of the aluminosilicate framework in the MAZ-type zeolite synthesized according to the present invention preferably ranges from 5 to 10. Furthermore, an X-ray diffraction diagram of the MAZ-type zeolite synthesized according to the present invention is essentially equivalent to an X-ray diffraction diagram of the synthetic MAZ-type zeolite which has been reported so far. From this, it is determined that structural features of the MAZ-type zeolite synthesized according to the present invention are the same as those of the conventional MAZ-type zeolite synthesized using an OSDA.

One feature of the production method of the present invention is to prepare a reaction mixture without adding any OSDAs which consist of organic compounds. That is, an aqueous aluminosilicate gel containing sodium ions and potassium ions is used as the reaction mixture. It is an essential condition for sodium ions and potassium ions to be present in the reaction mixture of the aqueous aluminosilicate gel. The presence of alkali metal ions other than sodium ions and potassium ions, such as lithium ions is not essential in the production method of the present invention. However, in the production method of the present invention, using lithium ions is not excluded.

Another feature of the production method of the present invention is to use a seed crystal. As the seed crystal, the one obtained by firing the MAZ-type zeolite produced by the conventional method, that is, a method using an OSDA to remove organic matters can be used. A synthetic method of the MAZ-type zeolite according to the conventional method is described in Patent Documents 1 and 2, and Non-Patent Documents 1 and 2 described above, for example, and is well known to a person skilled in the art. In the synthetic method of the MAZ-type zeolite according to the conventional method, the type of the OSDA used is not limited. In general, by using tetramethylammonium ions as an OSDA, the MAZ-type zeolite can be successfully produced.

In the synthesis of the seed crystal, it is preferred that alkali metal ions are added at the same time as addition of an OSDA to an alumina source and a silica source. As the alkali metal ions, sodium ions are preferably used. If the MAZ-type zeolite is synthesized in this way, then before it is used as a seed crystal, for example, it is fired at a temperature of 500° C. or higher in the air to remove the OSDA incorporated in the crystal. If the method of the present invention is performed using a seed crystal from which the OSDA is not removed, organic matters will be mixed into a waste liquid after the completion of the reaction. In addition, there is a possibility that the produced MAZ-type zeolite contains the OSDA, which is contrary to an object of the present invention.

In the production method of the present invention, the MAZ-type zeolite obtained according to the present invention can be used as a seed crystal. Since the MAZ-type zeolite obtained in the present invention essentially contains no organic compounds, it has an advantage of no need to be fired in advance when it is used as a seed crystal.

In either case of using the MAZ-type zeolite obtained according to the conventional method or using the MAZ-type zeolite obtained according to the present invention, an $SiO_2/Al_2O_3$ ratio of the seed crystal is in the range of 5-10 and preferably in the range of 6-8. By setting the $SiO_2/Al_2O_3$ ratio of the seed crystal equal to or greater than 5, the crystallization rate of the MAZ-type zeolite can be sufficiently fast. On the other hand, by setting the $SiO_2/Al_2O_3$ ratio equal to or less than 10, the MAZ-type zeolite can be easily synthesized.

The addition amount of the seed crystal is in the range of 0.1-30% by weight in relation to a silica component in the reaction mixture and preferably in the range of 1-20% by weight. Provided that the addition amount is within this range, the addition amount of the seed crystal is preferably less and is determined taking account of the reaction rate and the inhibitory effect of impurities.

The average particle size of the seed crystal is 0.1 μm or more, preferably ranges from 0.1 to 2 μm and more preferably from 0.2 to 1.0 μm. The crystal size of the zeolite obtained by synthesis is not generally uniform, and has a certain particle size distribution and therefore, it is not difficult to determine the crystal particle size having a maximum frequency therein. The average particle size refers to the particle diameter of the crystal having the maximum frequency, as observed by a scanning electron microscope. In order to synthesis a particle of less than 0.1 μm, a special device is necessary in many cases and becomes expensive. In the present invention, the MAZ-type zeolite having an average particle size of 0.1 μm or more is thus used as a seed crystal. In some cases, the size of the average particle size of the seed crystal may affect the crystallization rate and the size of the produced crystal, but the difference in the average particle size of the seed crystal essentially never hinder the synthesis of the MAZ-type zeolite.

The reaction mixture to which a seed crystal is added is obtained by mixing a silica source, an alumina source, an alkali source and water so that the reaction mixture has the composition represented by a molar ratio shown below. If the composition of the reaction mixture is out of this range, as is apparent from the results of Comparative Examples described later, it is impossible to obtain an MAZ-type zeolite of interest and instead, other zeolites such as a mordenite are produced.

$SiO_2/Al_2O_3$=24-60
$(Na_2O+K_2O)/SiO_2$=0.25-0.5
$K_2O/(Na_2O+K_2O)$=0.1-0.5
$H_2O/SiO_2$=5-50

The more preferred composition range of the reaction mixture is as follows.

$SiO_2/Al_2O_3$=26-55
$(Na_2O+K_2O)/SiO_2$=0.28-0.45
$K_2O/(Na_2O+K_2O)$=0.15-0.4
$H_2O/SiO_2$=10-30

The silica source used to obtain the reaction mixture having said molar ratio includes silica itself and a silicon-containing compound capable of forming silicate ions in water. Specifically, wet process silica, dry process silica, colloidal silica, sodium silicate, aluminosilicate gels and the like can be referred to. These silica sources can be used alone or in combination of two or more. Among these silica sources, the use of silica (silicon dioxide) is preferred in that it is possible to obtain a zeolite of interest without unwanted by-products.

As the alumina source, for example, a water-soluble aluminum-containing compound and powdered aluminum can be used. As the water-soluble aluminum-containing compound, sodium aluminate, aluminum nitrate, aluminum sulfate and the like can be referred to. Furthermore, aluminum hydroxide is also one of the preferred alumina sources. These alumina sources can be used alone or in combination with two or more. Among these alumina sources, the use of powdered aluminum, sodium aluminate or aluminum hydroxide is preferred in that it is possible to obtain a zeolite of interest without unwanted by-products (for example, sulfates and nitrates and the like).

As the alkali source, for example, sodium hydroxide and potassium hydroxide can be used. In the case of using potassium silicate as the silica source or using sodium aluminate as the alumina source, sodium or potassium, an alkali metal component contained therein is considered as NaOH or KOH at the same time and it is also the alkali component. Thus, said $Na_2O$ and $K_2O$ are calculated as the sum of all alkali components in the reaction mixture. Further, as described above, using sodium and potassium as an alkali metal used as the alkali source is essential and alkali metal ions other than them, for example, lithium ions are not essential in the production method of the present invention.

A method by which a uniform reaction mixture is easily obtained may be used as the order of addition of each raw material when preparing the reaction mixture. For example, at room temperature, an alumina source and an alkali source may be added to and dissolved in water, followed by adding a silica source and agitating and mixing to give a uniform reaction mixture. A seed crystal is added before adding the silica source or after mixing with the silica source. Thereafter, the mixture is agitated and mixed to ensure uniform dispersion of the seed crystal. There is no restriction on the temperature when preparing the reaction mixture.

In particular, it is preferred that since the MAZ-type zeolite of interest can be successfully obtained, after the reaction mixture not containing the seed crystal is put into an airtight vessel and preheated under autogenous pressure, the seed crystal is added. Especially, it is preferred that since the MAZ-type zeolite of interest can be more successfully obtained, after the reaction mixture is preheated and then rapidly cooled to room temperature, the seed crystal is added. In any case of these, preparation of the reaction mixture is preferably performed in the procedure of adding a silica source to a liquid containing an alumina source and an alkali source. The temperature and time of preheating of the reaction mixture is not particularly limited. Specifically, the temperature of preheating is preferably 80-200° C. and more preferably 100-200° C. The time of preheating is preferably 0.5-24 hours and particularly 1-20 hours provided that the temperature of preheating is within this range. The temperature of preheating and the crystallization temperature after adding the seed crystal may be the same or different temperatures, which is not particularly limited. It is sufficient to set the conditions under which crystallization efficiently proceeds in combination with the heating time.

The seed crystal is added to the reaction mixture which has or has not been subjected to preheating and then the reaction mixture containing the seed crystal is put into an airtight vessel, heated and reacted to crystallize the MAZ-type zeolite under autogenous pressure. An OSDA is not contained in the reaction mixture. A seed crystal which was obtained by the method described in Patent Document 1 or 2, or Non-Patent Document 1 or 2 described above can be subjected to an operation such as firing and used in a state in which no organic matters such OSDAs are contained.

If the MAZ-type zeolite is crystallized using the reaction mixture containing the seed crystal, it is preferred that heating is performed after aging since crystallization more easily proceeds. Aging refers to an operation of keeping the temperature lower than the reaction temperature for a certain period of time. In aging, in general, still standing is performed without agitating. It is known that aging has effects such as preventing by-production of impurities, allowing heating under agitation without by-production of impurities, and increasing the reaction rate, but their action mechanisms are not necessarily clear. The temperature and time of aging are set so that said effects can be maximally exhibited. In the present production method, aging is preferably performed at 20-80° C., more preferably at 20-60° C., preferably in the range of 2-24 hours.

While heating the reaction mixture containing the seed crystal to crystallize it, in order to achieve homogenization of the reaction mixture temperature, the reaction mixture may be agitated. The agitation can be performed by mixing with agitation blades and mixing by rotation of the vessel. The agitation intensity and speed of rotation may be adjusted depending on the temperature uniformity and the degree of impurities by-production. It may be intermittent agitation, not constant agitation.

In either case of performing crystallization under a still standing state and under an agitating state, heating is airtightly performed. Heating temperature ranges from 80 to 200° C., preferably from 120 to 200° C. and more preferably from 140 to 200° C. The heating is performed under autogenous pressure. Generation efficiency of the MAZ-type zeolite becomes worse at temperatures below 80° C., since the crystallization rate becomes extremely slow. On the other hand, at temperatures higher than 200° C., since an autoclave with high pressure resistance is required, not only economic efficiency is lacked, but also generation rate of impurities increases. Heating time is not critical in the present production method, and heating may be performed until the MAZ-zeolite with sufficiently high crystallinity is produced. In general, heating for about 2-150 hours provides the MAZ-type zeolite with satisfactory crystallinity.

The crystal of the MAZ-type zeolite is obtained by said heating. After completion of heating, the produced crystalline powders are separated from the mother liquor by filtration, followed by washing with water or warm water and drying. Firing is not needed and it can be used as an adsorbent and the like immediately after dehydration is performed because it essentially contains no organic materials in its dried state. In addition, when it is used as a solid acid catalyst, for example, it can be used as the $H^+$-type by firing after replacing $Na^+$ ions and $K^+$ ions in the crystal with $NH_4^+$ ions.

The MAZ-type zeolite obtained in the present production method can be suitably used as various catalysts such as olefin synthesis catalysts in the petrochemical industry or adsorption-separating agents in various industrial fields, for example.

EXAMPLES

Hereinafter, the present invention will be described in more detail by examples. However, the scope of the present invention is not limited to such examples. Unless mentioned otherwise, "%" refers to "% by weight". Analyzers used in the examples and comparative examples below are as follows.

Powder X-ray diffraction device: powder X-ray diffraction device MO3XHF[22] (radiation of CuKα-ray, voltage of 40 kV, current of 30 mA, scan step of 0.02°, and scan speed of 2°/min) made by Mac Science Co., Ltd.

Scanning electron microscope: Field emission scanning electron microscope S-4800 made by Hitachi High-Technologies Co., Ltd.

Composition analysis device: ICP-AES LIBERTY Series II made by Varian Co., Ltd.

Nitrogen adsorption character measuring device: AUTOSORB-1 made by Quantachrome Instruments Co., Ltd.

Ammonia temperature-programmed desorption (Temperature-Programmed Desorption, TPD) device: BEL-CAT made by BEL Japan, Inc.

Example 1

(1) Synthesis of Seed Crystals

Figure 1:
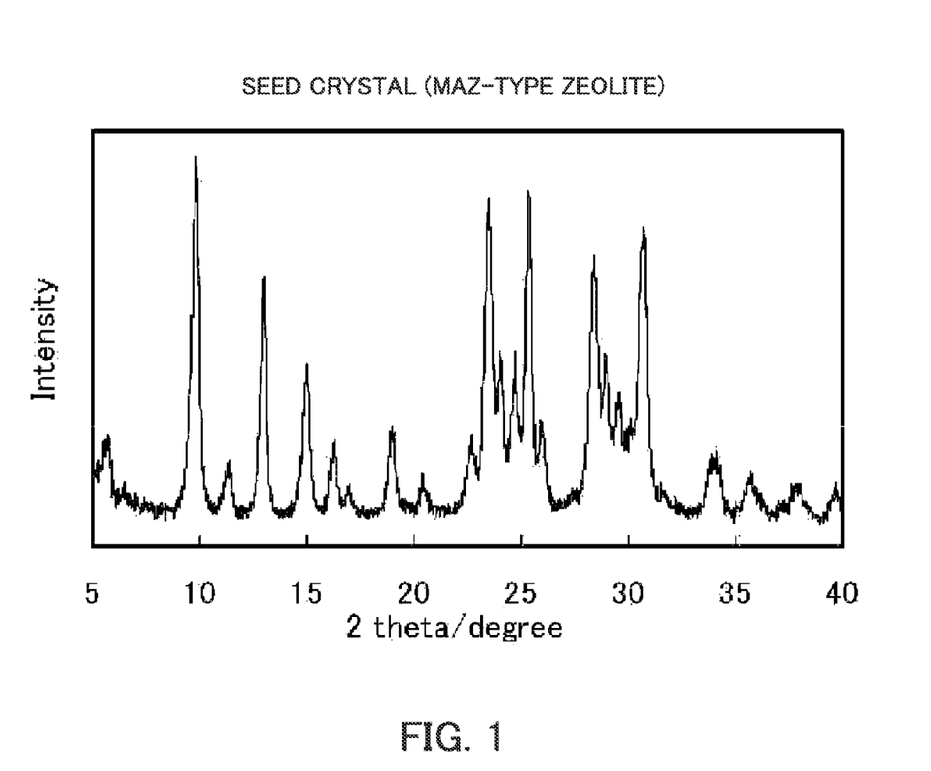
FIG. 1 is an X-ray diffraction diagram of a seed crystal of an MAZ-type zeolite used in Example 1.
Figure 4:
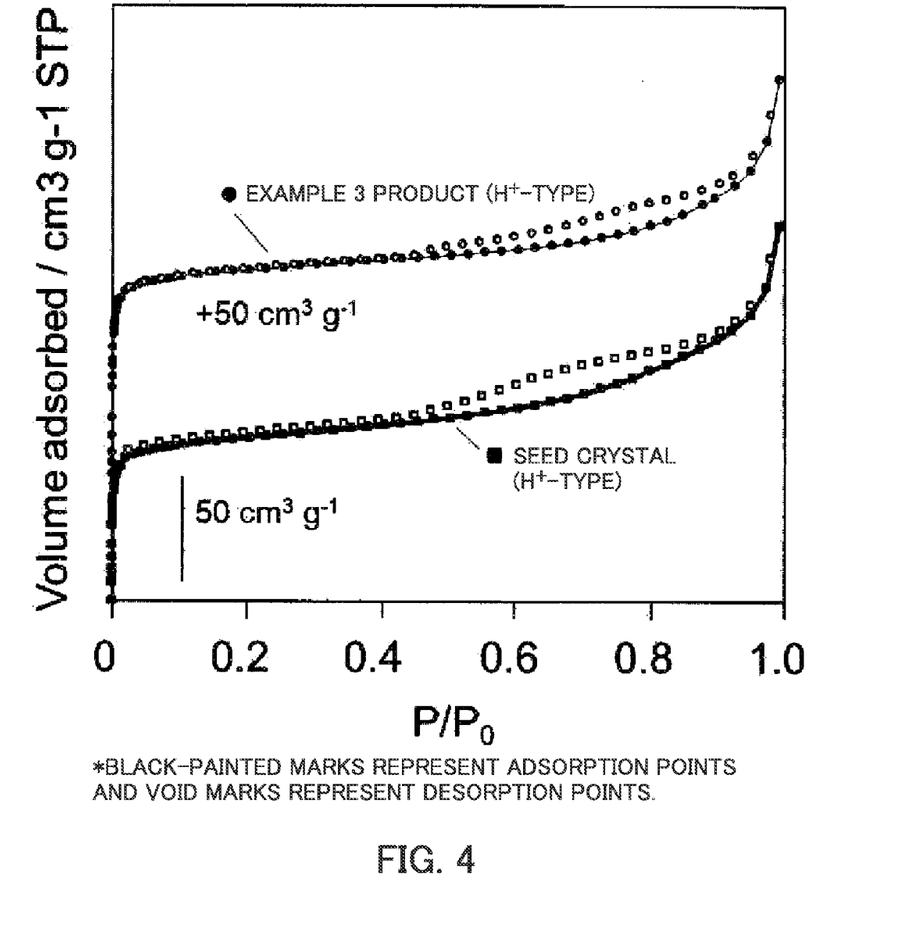
FIG. 4 is a nitrogen adsorption-desorption curve for the one obtained by converting the zeolite omega (MAZ-type zeolite) used as a seed crystal in Example 1 to H⁺-type and the one obtained by converting the MAZ-type zeolite obtained by Example 3 to H⁺-type at a liquid nitrogen temperature.
Figure 5:
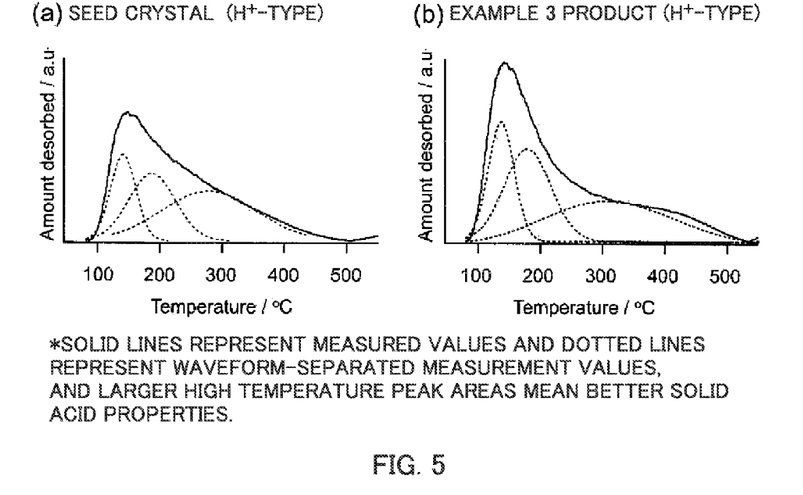

Tetramethylammonium hydroxide was used as an OSDA, and according to the conventional known method (Non-Patent Document 1) using sodium aluminate as an alumina source, colloidal silica (LUDOX, HS-40) as a silica source and sodium hydroxide as an alkali source, a reaction mixture was prepared. The reaction mixture was aged at room temperature for 3 days and then, put into a 23 cc stainless airtight vessel, and subjected to still stand and heating at 100° C. for 7 days to synthesize a crystal of a zeolite omega (MAZ-type zeolite). The zeolite omega was fired at 550° C. for 20 hours while circulating air in an electric furnace to produce a crystal of the zeolite omega containing no organic materials. This crystal was observed by a scanning electron microscope, proving that the average particle size was 0.85 μm. Composition analysis proved that the $SiO_2/Al_2O_3$ ratio was 6.8. An X-ray diffraction diagram of a fired zeolite omega is shown in FIG. 1. The crystal of the zeolite omega containing no organic matters was used as a seed crystal in the Examples and Comparative Examples described below. After the seed crystal was exchanged with $NH_4^+$ ions and fired to be the $H^+$-type, a nitrogen adsorption-desorption isotherm (FIG. 4) was measured at liquid nitrogen temperature. Evaluation of the pore properties from the isotherm proved the micropore surface area was 236 $m^2/g$ and the micropore volume was 0.093 cc/g. Furthermore, the solid acid amount calculated from the ammonia TPD desorption curve (FIG. 5 (*a*)) of the $H^+$-type sample was 0.93 mmol/g.

(2) Synthesis of MAZ-Type Zeolite

Figure 2:
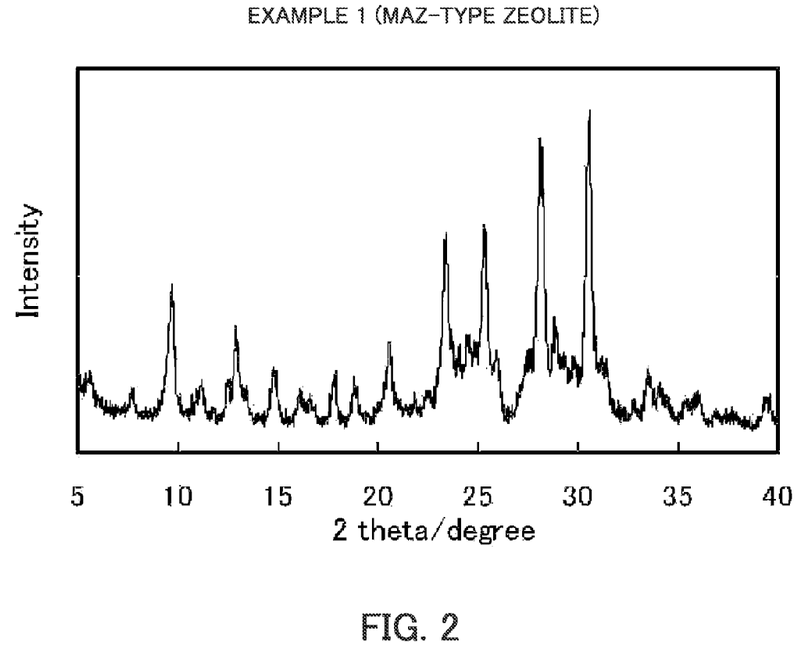
FIG. 2 is an X-ray diffraction diagram of an MAZ-type zeolite obtained by Example 1.

In 6.751 g of pure water, 0.157 g of sodium aluminate, 0.490 g of 50% potassium hydroxide and 1.309 g of 36% sodium hydroxide were dissolved to give an aqueous solution. To the aqueous solution, 1.316 g of powdered silica (Cab-O-Sil, M5) was added and uniformly mixed to give a gel having a composition described in Table 1. The reaction mixture was put into a 23 cc stainless airtight vessel and preheated at 140° C. for 5 hours without agitating. Then, after rapidly cooling the airtight vessel, 0.263 g of seed crystals of the zeolite omega containing no organic matters were added to the reaction mixture and uniformly mixed. Next, the airtight vessel was subjected to still standing and heating at 140° C. under autogenous pressure for 24 hours again. After cooling the airtight vessel, the product was filtered and washed with warm water to give a white powder. The product was subjected to X-ray diffraction measurement to confirm that it was an MAZ-type zeolite containing no impurities as shown in FIG. 2.

Example 2 or 10

Figure 3:
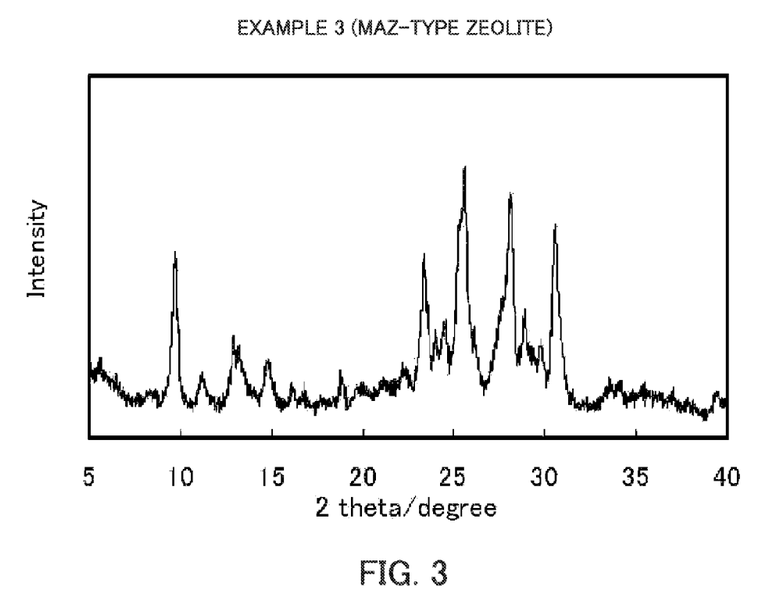
FIG. 3 is an X-ray diffraction diagram of an MAZ-type zeolite obtained by Example 3.

An MAZ-type zeolite was obtained in a similar way to Example 1 except that the conditions shown in Table 1 were employed. However, as shown in Table 1, in some cases, generation of a zeolite T was observed as a by-product in addition to the MAZ-type zeolite. An X-ray diffraction diagram measured for Example 3 in which only an MAZ-type zeolite was generated is shown in FIG. 3. After the crystal obtained in Example 3 was exchanged with $NH_4^+$ ions and fired to be the $H^+$-type, a nitrogen adsorption-desorption isotherm (FIG. 4) was measured at liquid nitrogen temperature. Evaluation of the pore properties from the isotherm proved the micropore surface area was 392 $m^2/g$ and the micropore volume was 0.15 cc/g. Furthermore, the solid acid amount calculated from the ammonia TPD desorption curve (FIG. 5 (*b*)) of the $H^+$-type sample was 1.14 mmol/g.

From this result, in the evaluation of the pore properties and the solid acid properties, it is understood that the MAZ-type zeolite obtained in Example 3 was superior to the zeolite omega (MAZ-type zeolite) used as the seed crystal in Example 1.

Comparative Example 1

In 7.407 g of pure water, 0.220 g of sodium aluminate, 0.312 g of 50% potassium hydroxide and 0.710 g of 36% sodium hydroxide were dissolved to give an aqueous solution. To the aqueous solution, 1.352 g of powdered silica (Cab-O-Sil, M5) and 0.268 g of seed crystals of the zeolite omega containing no organic matters were added and uniformly mixed to give a gel having a composition described in Table 2. The reaction mixture was put into a 23 cc stainless airtight vessel, and subjected to still standing and heating at 140° C. under autogenous pressure for 48 hours without agitating. After cooling the airtight vessel, the product was filtered and washed with warm water to give a white powder. The product was subjected to X-ray diffraction measurement to confirm that it was a mordenite.

Comparative Example 2 or 4

Similar operations to Comparative Example 1 were performed except that the conditions shown in Table 2 were employed. In Comparative Examples 2 and 3, products were observed, but they cannot be identified. In Comparative Example 4, generation of an amorphous material was observed.

TABLE 1

| | Composition of reaction mixture | | | | Seed crystal Amount of addition (wt %) | Preheating | | Crystallization conditions | | Product | |
|---|---|---|---|---|---|---|---|---|---|---|---|
| | $SiO_2/$ | $(Na_2O + K_2O)/$ | $K_2O/$ | $H_2O/$ | | Temper- | | Temper- | | | |
| Example | $Al_2O_3$ | $SiO_2$ | $(Na_2O + K_2O)$ | $SiO_2$ | | ature (° C.) | Time (h) | ature (° C.) | Time (h) | Zeolite | $SiO_2/Al_2O_3$ |
| 1 | 40 | 0.400 | 0.25 | 20 | 20 | 140 | 5 | 140 | 24 | MAZ-type zeolite + trace zeolite T | 6.6 |

TABLE 1-continued

| Example | Composition of reaction mixture SiO₂/Al₂O₃ | (Na₂O + K₂O)/SiO₂ | K₂O/(Na₂O + K₂O) | H₂O/SiO₂ | Seed crystal Amount of addition (wt %) | Preheating Temperature (°C.) | Time (h) | Crystallization conditions Temperature (°C.) | Time (h) | Product Zeolite | SiO₂/Al₂O₃ |
|---|---|---|---|---|---|---|---|---|---|---|---|
| 2 | 40 | 0.425 | 0.25 | 20 | 20 | 140 | 5 | 140 | 24 | MAZ-type zeolite + trace zeolite T | |
| 3 | 50 | 0.350 | 0.25 | 20 | 20 | 140 | 5 | 140 | 24 | MAZ-type zeolite | 6.4 |
| 4 | 50 | 0.400 | 0.25 | 20 | 20 | 140 | 5 | 140 | 24 | MAZ-type zeolite | 7.0 |
| 5 | 28 | 0.350 | 0.25 | 20 | 20 | — | — | 100 | 144 | MAZ-type zeolite + amorphous material | |
| 6 | 28 | 0.350 | 0.25 | 20 | 20 | — | — | 140 | 48 | MAZ-type zeolite + zeolite T | |
| 7 | 28 | 0.400 | 0.25 | 20 | 20 | — | — | 140 | 48 | MAZ-type zeolite + zeolite T | |
| 8 | 28 | 0.350 | 0.25 | 20 | 20 | 140 | 5 | 140 | 24 | MAZ-type zeolite + trace zeolite T | 8.2 |
| 9 | 28 | 0.300 | 0.25 | 20 | 20 | 140 | 5 | 140 | 24 | MAZ-type zeolite + trace zeolite T | |
| 10 | 28 | 0.350 | 0.25 | 20 | 20 | 170 | 2 | 170 | 3 | MAZ-type zeolite + a small amount of zeolite T | |

TABLE 2

| Comparative Example | Composition of reaction mixture SiO₂/Al₂O₃ | (Na₂O + K₂O)/SiO₂ | K₂O/(Na₂O + K₂O) | H₂O/SiO₂ | Seed crystal Amount of addition (wt %) | Preheating Temperature (°C.) | Time (h) | Crystallization conditions Temperature (°C.) | Time (h) | Product Zeolite |
|---|---|---|---|---|---|---|---|---|---|---|
| 1 | 28 | 0.250 | 0.25 | 20 | 20 | — | — | 140 | 48 | Mordenite |
| 2 | 20 | 0.375 | 0.25 | 20 | 10 | — | — | 100 | 96 | Unidentified material |
| 3 | 20 | 0.400 | 0.25 | 20 | 10 | — | — | 100 | 96 | Unidentified material |
| 4 | 28 | 0.350 | 0.00 | 20 | 10 | — | — | 100 | 120 | Amorphous material |

As is apparent from the comparison between Tables 1 and 2, it is understood that by using a particular MAZ-type zeolite as a seed crystal and adding it to a reaction mixture having a particular composition to perform crystallization, an MAZ-type zeolite can be obtained. If the value of (Na₂O+K₂O)/SiO₂ in the reaction mixture was low (Comparative Example 1), a mordenite was produced, and if the value of SiO₂/Al₂O₃ in the reaction mixture was low (Comparative Examples 2 and 3), an unidentifiable material was produced. Furthermore, if only sodium was used as the alkali source and potassium was not used (Comparative Example 4), an amorphous material was produced.

The invention claimed is:

1. A production method for an MAZ-type zeolite, which comprises
   (1) mixing a silica source, an alumina source, an alkali source and water so as to be a reaction mixture having a composition represented by a molar ratio given below;
   $SiO_2/Al_2O_3 = 24\text{-}60$
   $(Na_2O+K_2O)/SiO_2 = 0.25\text{-}0.5$
   $K_2O/(Na_2O+K_2O) = 0.1\text{-}0.5$
   $H_2O/SiO_2 = 5\text{-}50$
   (2) using an MAZ-type zeolite having no organic matters which has an $SiO_2/Al_2O_3$ ratio of 5-10 and an average particle size of 0.1 μm or more, as a seed crystal, and adding the MAZ-type zeolite to the reaction mixture at a proportion of 0.1-30% by weight with respect to a silica component in the reaction mixture; and
   (3) airtightly heating the reaction mixture to which the seed crystal is added at 80-200° C.

2. The production method according to claim 1, wherein the reaction mixture is agitated in the airtightly heating process.

3. The production method according to claim 1, wherein after the reaction mixture not containing the seed crystal is airtightly preheated at a temperature of 80-200° C., the seed crystal is added to the reaction mixture, and the reaction mixture is further airtightly heated at a temperature of 80-200° C.

4. The production method according to claim 2, wherein the reaction mixture is agitated in the airtightly heating process.

* * * * *